US008514205B2

(12) United States Patent
Davis et al.

(10) Patent No.: US 8,514,205 B2
(45) Date of Patent: Aug. 20, 2013

(54) CIRCUIT FOR ELECTROSTATICALLY DRIVING A PLANT SUCH AS A COMB-DRIVE MICROELECTROMECHANICAL SYSTEM (MEMS) MIRROR AND RELATED SUBSYSTEM, SYSTEM, AND METHOD

(75) Inventors: Wyatt O. Davis, Bothell, WA (US); Gregory T. Gibson, Snohomish, WA (US); Thomas W. Montague, Mercer Island, WA (US); Robert J. Dunki-Jacobs, Mason, OH (US); Michael P. Weir, Blanchester, OH (US)

(73) Assignee: Microvision, Inc., Redmond, WA (US)

( * ) Notice: Subject to any disclaimer, the term of this patent is extended or adjusted under 35 U.S.C. 154(b) by 1201 days.

(21) Appl. No.: 11/648,852

(22) Filed: Dec. 29, 2006

(65) Prior Publication Data

US 2008/0158631 A1  Jul. 3, 2008

(51) Int. Cl.
*G09G 5/00* (2006.01)

(52) U.S. Cl.
USPC ........ 345/204; 345/103; 345/213; 359/199.2; 359/290; 359/291

(58) Field of Classification Search
USPC .............. 345/7–9, 103, 213, 204; 359/199.1, 359/199.2, 204, 236, 237, 291, 292
See application file for complete search history.

(56) References Cited

U.S. PATENT DOCUMENTS

| 6,040,567 | A | 3/2000 | Neher et al. |
| 6,204,829 | B1 * | 3/2001 | Tidwell .............................. 345/7 |
| 7,580,007 | B2 * | 8/2009 | Brown et al. .................... 345/15 |
| 2002/0050956 | A1 * | 5/2002 | Gerhard et al. ................... 345/7 |
| 2004/0100679 | A1 * | 5/2004 | Kuo .............................. 359/291 |
| 2004/0263937 | A1 * | 12/2004 | Fujii et al. ...................... 359/212 |
| 2005/0030606 | A1 | 2/2005 | Nakajima |
| 2005/0253055 | A1 * | 11/2005 | Sprague et al. ............... 250/234 |
| 2006/0164710 | A1 * | 7/2006 | Fujii et al. ...................... 359/224 |
| 2006/0208607 | A1 * | 9/2006 | Yoon et al. ..................... 310/309 |

OTHER PUBLICATIONS

Chen, Ching-Heng et al., "Electrical Breakdown Phenomena for Devices with Micron Separations", *Journal of Micromechanics and Microengineering* vol. 16, No. 7, Institute of Physics Publishing, Bristol, GB Jul. 1, 2006.
Conant, Robert A. et al., "A rastor-scanning full-motion video display using polysilicon micromachined mirrors", *Sensors and Actuators* 83 (2000), 291-296.
Schenk, Harald et al., "Large Defelction Micromechanical Scanning Mirrors for Linear Scans and Pattern Generation", *IEEE Journal of Selected Topics in Quantum Electronics*, vol. 6, No. 5, Sep./Oct. 2000, 715-722.

* cited by examiner

*Primary Examiner* — Jennifer Nguyen
(74) *Attorney, Agent, or Firm* — Kevin D. Wills

(57) ABSTRACT

A drive circuit includes a generator and a driver. The generator generates a signal having a period and a varying amplitude during a driving portion of the period, and the driver is coupled to the generator and drives a plate of an electrostatically drivable plant with the signal. The drive circuit may be used to drive a mirror plate of a comb-drive MEMS mirror.

2 Claims, 6 Drawing Sheets

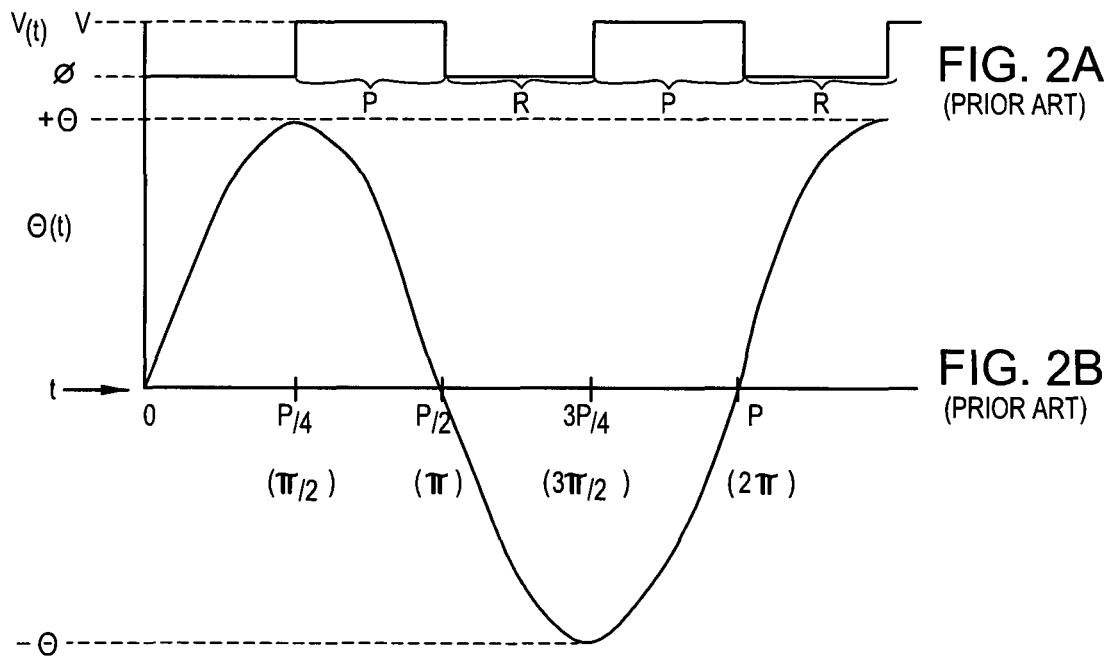
FIG. 2A (PRIOR ART)
FIG. 2B (PRIOR ART)
FIG. 3
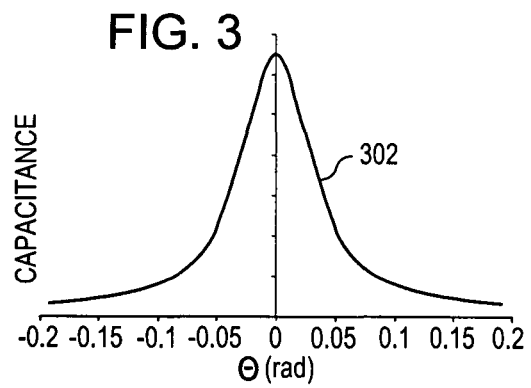
FIG. 12
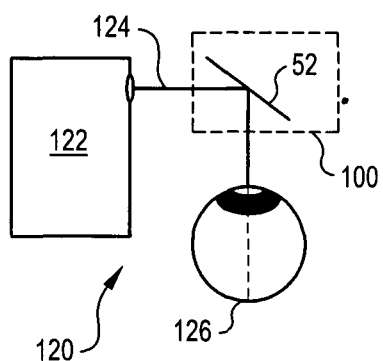

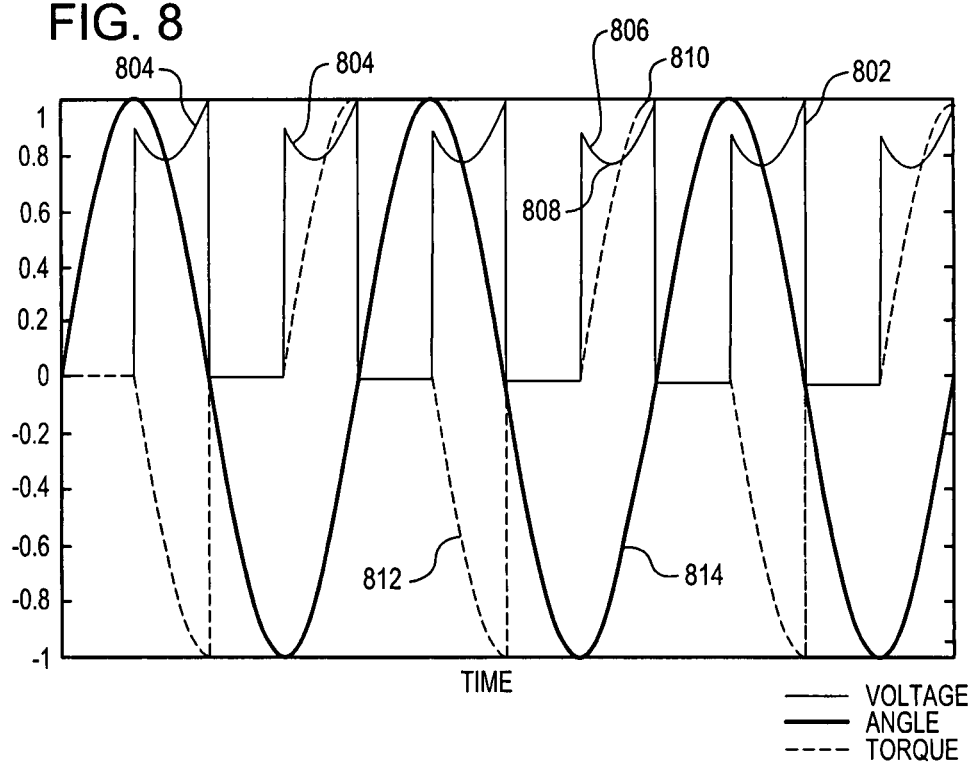
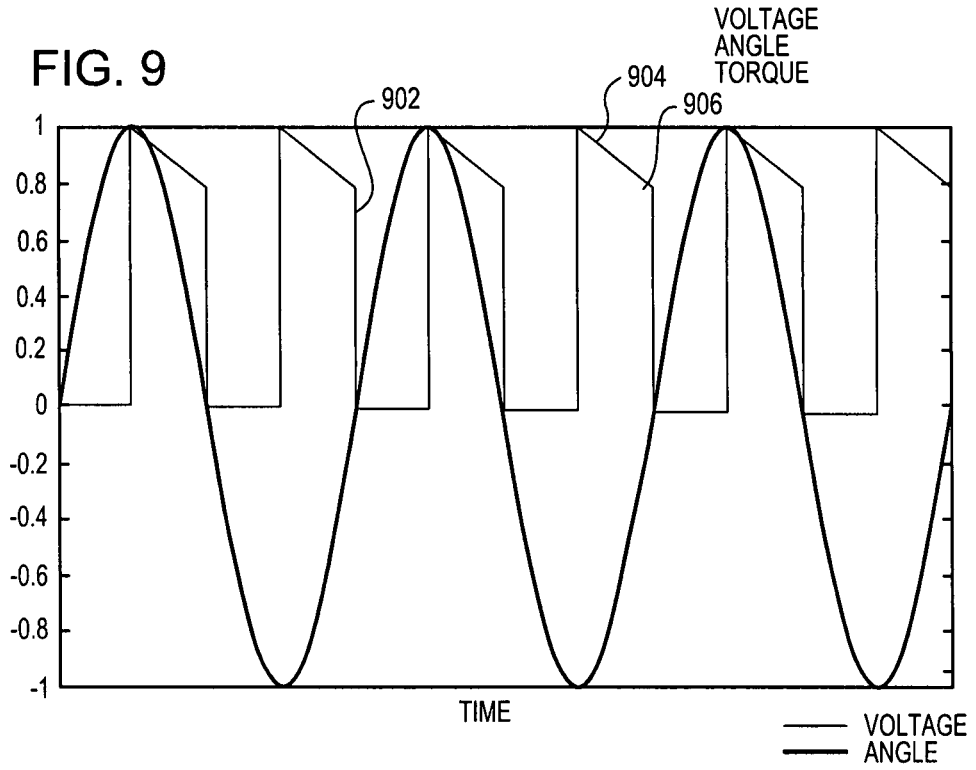

CIRCUIT FOR ELECTROSTATICALLY DRIVING A PLANT SUCH AS A COMB-DRIVE MICROELECTROMECHANICAL SYSTEM (MEMS) MIRROR AND RELATED SUBSYSTEM, SYSTEM, AND METHOD

BACKGROUND

FIG. 1 is a perspective view of a comb-drive microelectromechanical system (MEMS) mirror 10, which is a resonant, electrostatically drivable plant. The MEMS mirror 10 includes an electrically conductive stationary plate 12, which defines an opening 14, which includes alternating protrusions, i.e., "fingers" 16a, and spaces 18a along a side 20a of the opening, and which includes alternating fingers 16b and spaces 18b along an opposite side 20b of the opening. The MEMS mirror 10 also includes an electrically conductive mirror plate 22, which is disposed in the opening 14 and is electrically insulated from the plate 12, and includes tabs 24a and 24b, which anchor the plate 22 to the stationary plate 12 via torsion arms 26a and 26b. The mirror plate 22 includes a surface 27 that is coated with a reflective material to form a mirror on the surface, includes alternating fingers 28a and spaces 30a, which are respectively aligned with the spaces 18a and the fingers 16a, and includes alternating fingers 28b and spaces 30b, which are respectively aligned with the spaces 18b and the fingers 16b. Consequently, the fingers 16 are interleaved with the protrusions 28 such that the mirror plate 22 can resonate back and forth about the arms 26a and 26b relative to the stationary plate 12. As discussed further below, one can cause the mirror plate 22 to resonate in a controlled manner by periodically generating a non-zero voltage difference between the stationary plate 12 and the mirror plate 22. This voltage difference generates a periodic electrostatic force that periodically attracts the mirror plate 22 to the stationary plate 12, the majority of this attractive force being between the interleaved fingers 16 and 28. Because the electrostatic force is periodic, it may cause the mirror plate 22 to oscillate back and forth relative to the stationary plate 12, such as in resonance. One may use the oscillating or resonating mirror plate 22 to, e.g., scan or capture an image by sweeping one or more modulated beams of light (not shown in FIG. 1).

FIG. 2A is a plot versus time of a square-wave voltage V(t) with which one can drive the MEMS mirror 10 of FIG. 1 to oscillate in resonance.

FIG. 2B is a plot versus time of the angular displacement, i.e., amplitude, $\Theta(t)$ of the mirror plate 22 of FIG. 1 relative to the stationary plate 12 when one drives the MEMS mirror 10 of FIG. 1 with the voltage V(t) of FIG. 2A. The time $T_r$ is the period of the resonating mirror 22 and is equivalent to a cycle of $2\pi$ radians, where the resonant radial frequency $\omega_r$ of the mirror plate 22 is given by the following equation:

$$\omega_r = 2\pi/T_r = 2\pi f_r \quad (1)$$

where $f_r = 1/T_r$ = the resonant frequency of the mirror plate 22. The resonant frequency $f_r$ is set by parameters of the MEMS mirror 10, including the stiffness of the torsion arms 26a and 26b and the mass and dimensions of the mirror plate 22.

Referring to FIGS. 1-2B, in operation one first starts the mirror plate 22 resonating, such as oscillating in resonance. Because the mirror plate 22 is relatively light, one may start the plate resonating by merely moving the MEMS mirror 10 or an apparatus (not shown) in which the MEMS is disposed, or by using another known starting technique.

Next, when the mirror plate 22 has a maximum amplitude $\Theta$ in a first direction (shown as positive amplitude $+\Theta$ in FIG. 3) at time $T_r/4$ (or at any equivalent time $(4n+1)T_r/4$, where n is any integer and where $(4n+1)T_r/4$ is equivalent to $(4n+1)\pi/2$ radians), one generates a non-zero constant voltage difference V between the stationary plate 12 and the mirror plate. One may generate this voltage difference by grounding the stationary plate 12 and applying the voltage V to the plate mirror 22, by grounding the mirror plate and applying the voltage V to the stationary plate, or by respectively applying non-zero voltages V1 and V2 (not shown in FIGS. 1-2B) to the stationary and mirror plates such that $|V1-V2|=V$. Furthermore, techniques for sensing the amplitude $\Theta(t)$ of the mirror plate 22 and for generating the voltage V when $\Theta(t)=+\Theta$ are known, and, therefore, are not discussed.

As discussed above, the voltage difference V generates an attractive force between the interleaved fingers 16 and 28, and this force effectively pulls the fingers 28 back toward the fingers 16 until the mirror plate 22 moves into a zero-displacement position at time $T_r/2$ when the mirror plate is substantially coplanar with the stationary plate 12 (assuming that the fingers 16 and 28 have substantially the same thickness and that neither of the plates is distorted).

Then, in response to the plate 22 being in the zero-displacement position at $T_r/4$, one generates a voltage difference V(t)=0 between the plates 12 and 22 such that there is no electrostatic attraction force between the plates. This absence of an electrostatic force allows the momentum of the mirror plate 22 to rotate the mirror plate to the maximum amplitude (shown as negative amplitude $-\Theta$ in FIG. 2B) in a second direction that is opposite to the first direction at time $3T_r/4$.

Next, in response to the mirror plate 22 having the maximum negative amplitude $-\Theta$ at time $3T_r/4$, one generates V(t)=V.

As discussed above, the voltage difference V generates an attractive force between the interleaved fingers 16 and 28, and this force effectively pulls the fingers 28 back toward the fingers 16 until the mirror plate 22 moves back into the zero-displacement at time $T_r$.

Then, as discussed above, in response to the plate 22 being in the zero-displacement position, one generates a voltage difference V(t)=0 between the plates 12 and 22 such that there is no electrostatic attraction force between the plates. This absence of an electrostatic force allows the momentum of the mirror plate 22 to rotate the mirror plate back to the maximum amplitude $+\Theta$ at time $5T_r/4$.

Next, in response to the mirror plate 22 having the maximum positive amplitude $+\Theta$ at time $5T_r/4$, one generates V(t)=V to repeat the above-described cycle.

Because when V(t)=V an electrostatic force exists between the plates 12 and 22, one may call the portions $T_r/4 \rightarrow T_r/2$ and $3T_r/4 \rightarrow T_r$ of the period $T_r$ the driving portions P of the period $T_r$.

In contrast, because when V(t)=0 no electrostatic force exists between the plates 12 and 22, one may call the portions $0 \rightarrow T_r/4$ and $T_r/2 \rightarrow 3T_r/4$ of the period $T_r$ the relaxation portions R of the period $T_r$.

Still referring to FIGS. 1-2B, it is sometimes desired to drive the mirror plate 22 to a large amplitude, with a simple velocity profile, at a frequency f that is slightly different, for example, ±5% different, than the resonant frequency $f_r$, and/or to better control the amplitude $\Theta(t)$ or for other reasons. Additionally, it may be desirable to avoid a large voltage V during portions of the normal drive periods P where portions of the MEMS scanner are in close proximity to one another, for example to avoid electrical arcing.

Unfortunately, it is often difficult reach large amplitudes, and difficult to impossible to drive the mirror plate 22 to have a simple velocity profile or at frequencies that are more than a few fractions of a percent different than $f_r$ using the square-wave voltage V(t).

SUMMARY

An embodiment of a drive circuit includes a generator and a driver. The generator generates a signal having a period and a time-varying amplitude during a driving portion of the period, P. The driver is coupled to the generator and drives a plate of an electrostatically drivable plant with the signal.

Because such a drive circuit can generate a voltage having a varying driving amplitude, the drive circuit may, according to an embodiment, drive a mirror plate of a comb-drive MEMS mirror at a frequency that is farther away from the mirror's resonant frequency than can a drive circuit that generates a square-wave voltage signal such as shown in FIG. 2A. According to embodiments, the drive voltage may further or alternatively be varied to reduce a tendency to incur electrical arcing between closely spaced portions of the MEMS mirror. According to embodiments, use of a variable drive voltage may allow modification of the MEMS mirror design such as to reduce size, cost, etc.

BRIEF DESCRIPTION OF THE DRAWINGS

FIG. 2A is a plot versus time of a square-wave voltage V(t) that one may use to conventionally drive the MEMS mirror of FIG. 1.

FIG. 2B is a plot versus time of the amplitude $\Theta(t)$ of the mirror plate of the MEMS mirror of FIG. 1 relative to the stationary plate of the MEMS mirror when one drives the MEMS mirror with the square-wave voltage V(t) of FIG. 2A.

FIG. 3 is a plot of the calculated variation of stored capacitance between the moving body and fixed frame of a MEMS scanner shown in FIG. 1 as a function of rotation angle, according to an embodiment.

FIG. 8 illustrates an approach to compensate for a nonlinear torque response of a plant such as a MEMS scanner according to an embodiment.

FIG. 9 illustrates another variable drive voltage embodiment that may be used, for example to avoid a dielectric breakdown voltage.

FIG. 12 is a block diagram of a scanned-image-generating system that incorporates the beam-sweeping subsystem of FIG. 11 according to an embodiment.

DETAILED DESCRIPTION

The following discussion is presented to enable a person skilled in the art to make and use one or more embodiments of the invention. The general principles described herein may be applied to embodiments and applications other than those detailed below without departing from the spirit and scope of the invention. Therefore the present invention is not intended to be limited to the embodiments shown, but is to be accorded the widest scope consistent with the principles and features disclosed or suggested herein.

A MEMS scanner may be operated as a harmonic oscillator. An equation of motion for such a scanner may be expressed as:

$$J(d\Theta^2/d^2t) + k\Theta = T_d + T_e \tag{2}$$

where $\Theta$ is an angle, $(d\Theta^2/d^2t)$ is the second derivative of angle with respect to time (i.e., acceleration), J is an equivalent moment of inertia, k is an equivalent spring constant, $T_d$ is a damping torque, and $T_e$ is an applied electrostatic torque. As mentioned above, the electrostatic torque $T_e$ arises from driving the interdigitated comb finger structure shown in FIG. 1.

As will be seen, the electrostatic torque $T_e$ may be affected by a number of geometric (and other) factors.

Figure 1:
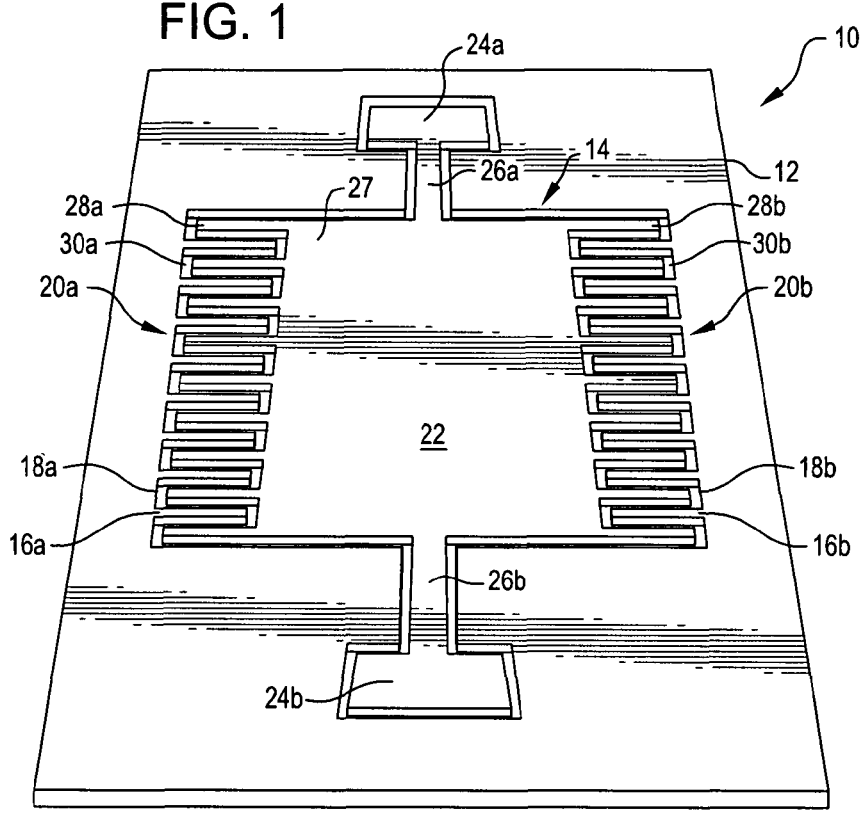
FIG. 1 is a perspective view of a conventional comb-drive microelectromechanical system (MEMS) mirror.
Figure 4A:
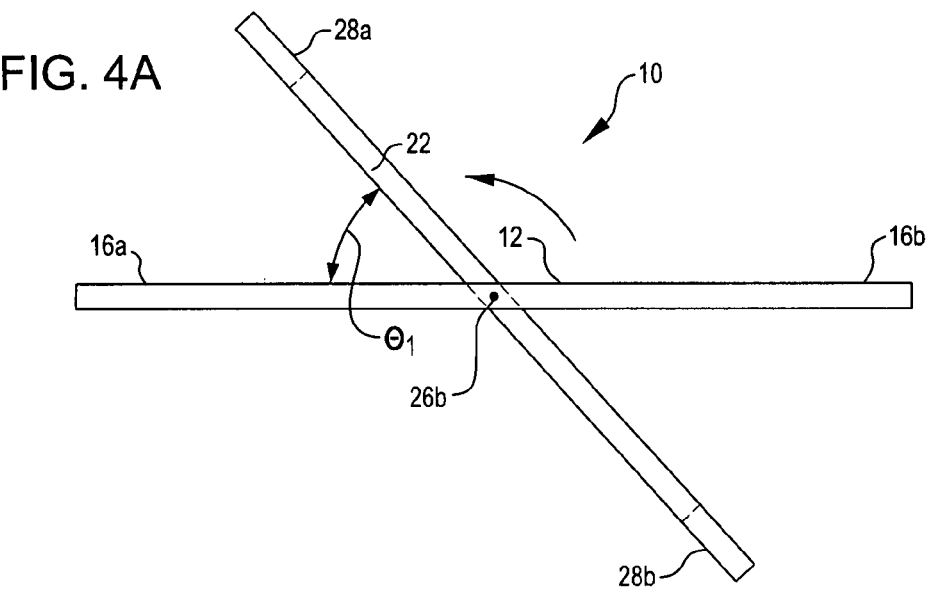
FIG. 4A is an end view of the MEMS mirror of FIG. 1 when the mirror plate has a non-zero amplitude $\Theta(t)$ and illustrates some of the parameters upon which the drive torque depends according to an embodiment.
Figure 4B:
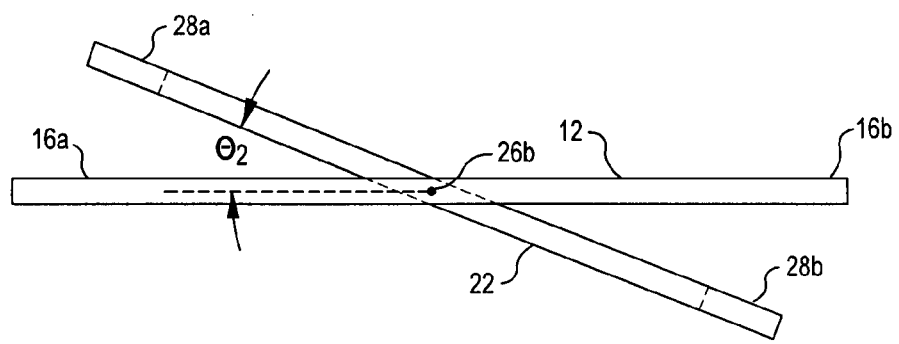
FIG. 4B is an end view of the MEMS mirror of FIG. 1 when the mirror plate has a different non-zero amplitude $\Theta(t)$ than is shown in FIG. 4A according to an embodiment.

FIG. 3 is an illustration of the variation of stored capacitance 302 between the moving body 22 and fixed frame 12 of a MEMS scanner shown in FIG. 1 as a function of rotation angle $\Theta$, according to an embodiment. For a MEMS scanner having in-plane electrostatic drive fingers as shown in FIG. 1, the capacitance C between the moving body 22 and the fixed frame 12 is dominated by the capacitance between the interdigitated comb fingers 28a, 28b of the moving body 22 and the respective comb fingers 16a, 16b of the fixed frame 12. The capacitance of the interdigitated comb fingers has a maximum value when the moving body 22 is in the same plane as the fixed frame 12, and decreases as the fingers progressively disengage while the moving body 22 rotates about an axis defined by the torsion arms 26a, 26b by an angle $\Theta$, as shown in FIGS. 4A and 4B.

The potential energy U stored in the capacitance may be written as:

$$U = \tfrac{1}{2} C V^2 \tag{3}$$

Where V is the voltage difference between the moving body 22 and the fixed frame 12. The electrostatic torque $T_e$ may be computed as the gradient of the potential energy, I.e:

$$T_e = -dU/d\Theta \tag{4}$$

Substituting:

$$T_e = \tfrac{1}{2}(-dC/d\Theta)V^2$$

The applied electrostatic torque is therefore strongly dependent on the angular rotation $\Theta$. That is, a constant drive voltage V does not generate a constant electrostatic torque $T_e$. Competing geometric effects cause the applied electrostatic torque $T_e$ to vary as a function of angular rotation $\Theta$.

FIG. 4A is an end view of the MEMS mirror 10 of FIG. 1 at a first time $t_1$ defined by $P/4 < t_1 < P/2$ of FIGS. 2A-2B, when the mirror plate 22 has a first positive amplitude $\Theta(t) = \Theta_1$ and is rotating toward zero amplitude $\Theta(t) = 0$ at time $P/2$. Note that "P" is used to denote the period of the mirror plate instead of "$P_r$," because the following discussion may apply even where the mirror plate is oscillating at other than its resonant frequency $f_r$.

FIG. 4B is an end view of the MEMS mirror 10 of FIG. 1 at a second time $t_2$ defined by $t_1 < t_2 < P/2$ of FIGS. 2A-2B when the mirror plate 22 has a second positive amplitude $\Theta_2 < \Theta_1$ and is continuing to rotate toward zero amplitude $\Theta(t) = 0$ at time $P/2$.

Figure 5:
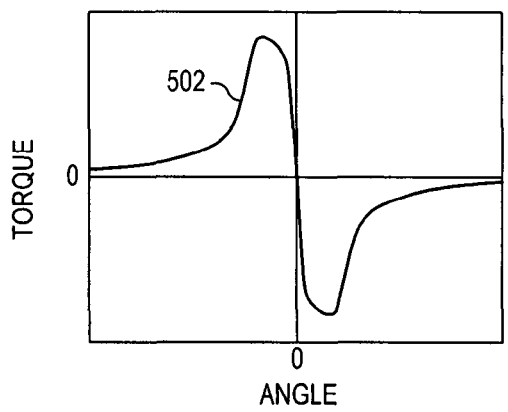
FIG. 5 is an illustration of computed electrostatic torque as a function of angular rotation at a constant drive voltage according to an embodiment.

FIG. 5 is an illustration of computed electrostatic torque $T_e$ 502 as a function of angular rotation $\Theta$ at a constant drive voltage. The odd-function antisymmetric dependence of electrostatic torque $T_e$ on angle $\Theta$ and the square-law dependence of electrostatic torque $T_e$ on relative voltage V is indicative that the electrostatic torque cannot both attract the moving body 22 to the fixed frame 12 and repel the moving body 22 from the fixed frame 12. Indeed, the electrostatic torque $T_e$ can only act to attract the moving body 22 toward the fixed frame, i.e. toward zero angle $\Theta = 0$.

A consequence of the form of the electrostatic torque $T_e$ is that the harmonic oscillator (e.g. MEMS scanner of FIG. 1) cannot be directly displaced from zero angle $\Theta = 0$ by an applied voltage. This presents a difficulty in achieving steady-state harmonic oscillations. It is known that the moving body 22 can be made to oscillate for certain values of applied voltage and excitation frequency. The strong dependence of the electrostatic torque $T_e$ on rotation angle $\Theta$ leads to parametric resonances. The parametric resonances may respond to infinitesimal perturbations of the position of the moving body 22 from the zero position $\Theta = 0$ to exhibit periodic oscillations. According to some embodiments response to infinitesimal perturbations from zero position may be a mechanism for starting up scanner oscillations.

Figure 6:
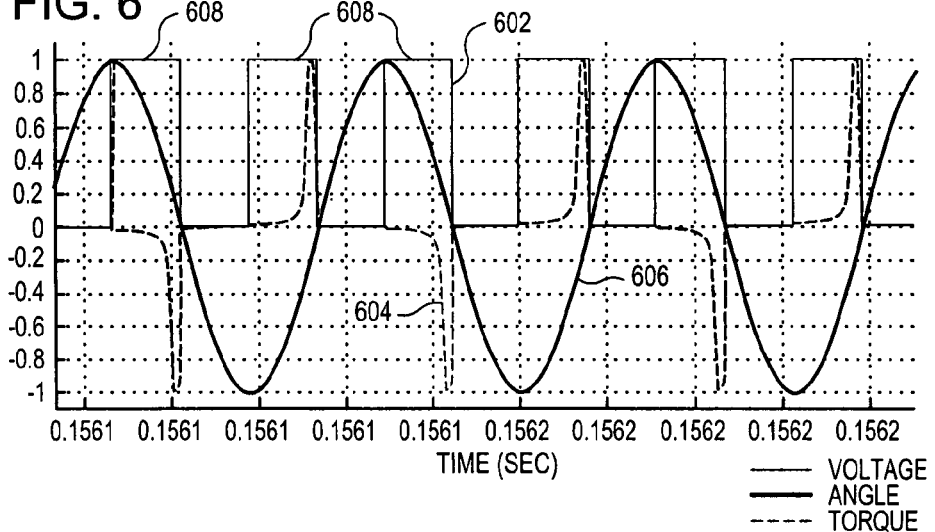
FIG. 6 illustrates a simplified computed relationship between a square-wave drive voltage, an electrostatic drive torque, and a periodic angular displacement for a plant such as the MEMS scanner of FIG. 1, according to an embodiment.

As shown above in FIGS. 2A and 2B, one way to drive the MEMS scanner of FIG. 1 is to apply a square wave voltage across the comb finger electrodes at a frequency of approximately twice the resonance frequency of the moving body 22. FIG. 6 illustrates a simplified computed relationship between a square-wave drive voltage V 602, an electrostatic drive torque $T_e$ 604, and the periodic angular displacement 606 for a plant such as the MEMS scanner 10 of FIG. 1. It may be noted that the period $P_O$ of the periodic displacement or oscillation is substantially equal to the period $P_T$ of the drive torque, and that both are substantially twice the period of the applied drive voltage $P_V$. During the drive periods of the voltage 602, the voltage V is held at a constant value as seen by flat portions 608.

Figure 7:
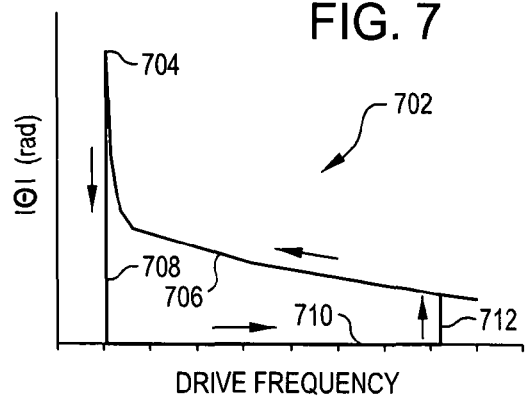
FIG. 7 is an illustrative response curve for peak absolute angular displacement vs. drive frequency showing hysteresis behavior, according to an embodiment.

The non-linear nature of the drive torque $T_e$ may produce instabilities in the frequency response of the plant. For example, there may be steady oscillations in angular displacement (of non-zero amplitude) of the moving body 22 only at certain frequencies and at a sufficient drive voltage. FIG. 7 is an illustrative response curve 702 for peak absolute angular displacement $|\Theta|$ vs. drive frequency. The peak maximum displacement has a value at 704 corresponding to a drive voltage period equal to half the resonant frequency of the plant 10. The peak value at 704 may be reached by starting at a drive frequency somewhat higher than half the resonant frequency and then decreasing the drive frequency along a portion of the curve 706 illustrated by the left-facing arrow. Near the peak response 704, a small perturbation in drive frequency, or in the resonant frequency of the system, or, for example, arising from a mechanical impulse on the system can result in a drop from the peak response 704 to substantially zero along the curve portion 708. To return the peak angular displacement to a non-zero value, the drive frequency is increased along curve portion 710 to a somewhat higher frequency until the absolute value of the peak angular displacement $|\Theta|$ is raised along the curve portion 712. Thus the curve portions 706, 708, 710, and 712 form a hysteresis loop, across the range of which two peak angular displacements are possible, one being zero (illustrated by curve portion 710) and the other being non-zero (illustrated by curve portion 706).

In practice, it may be desirable to operate the system as near as possible to a drive frequency corresponding to the peak system response 704. Unfortunately, as may be seen from the curve 702 of FIG. 7, operation near the peak response 704 may be problematic owing to instability of the system. It may be desirable to improve the tolerance of the system to variations in resonant frequency and/or in drive frequency, tolerance to impulse inputs such as shock, tolerance to periodic inputs such as vibration, and/or other variations.

FIG. 8 illustrates an approach to compensate for a nonlinear torque response of a plant such as a MEMS scanner according to an embodiment. The drive voltage 802 is selected to compensate for the nonlinear torque characteristics of the system, described above. During the drive periods of the voltage 802, the voltage V is varied as seen by curved portions 804. In the embodiment illustrated by FIG. 8, the drive voltage V 802 may be set at a relatively high level during a first portion 806 of the drive portion. Referring to FIGS. 4A and 4B, such a relatively high level may be used to overcome the relatively reduced drive efficiency encountered when the mirror plate 22 is at a large angular displacement $\Theta(t)$, corresponding to relatively low effective drive area $A(t)$ and relatively high distance $D(t)$. During a second portion 808 of the drive portion, the drive voltage V is reduced to accommodate the increased drive efficiency encountered when the area $A(t)$ is near $A_{max}$ and $D(t)$ is low. During a third portion 810 of the drive portion, drive voltage V is again increased to compensate for reduced area A caused by the stationary drive fingers 16a, 16b being increasingly overlapped by moving drive fingers 28a, 28b as the MEMS mirror plate 22 rotates into the plane of the fixed plate 12. While the voltage is shown as smoothly varying from high to low to high during the drive portion P of the drive signal in the example of FIG. 8, other approaches may be used. For example, the voltage may be moved in a discontinuous function such as a step function, a pulse width modulated function, or discontinuous function such as a linear ramp down followed by a flat area followed by a linear ramp up, for example.

The resultant applied torque 812 is similar to an ideal sinusoid except it is only active during those portions of the motion when the attractive forces add energy to the oscillating system. The shape of the torque curve 812 may result in several benefits. For example, such benefits may include reducing the harmonic distortion of the oscillations 814, reducing instabilities such as the frequency response instabilities, and generally causing the system to behave closer to an ideal harmonic oscillator with predicable behavior. This may result in increased tolerance to vibration, shock, temperature variations, and other external effects and help reduce the tendency for the system to move from high displacement to low displacement along hysteresis loop portion 708 (FIG. 7). In addition, reduced distortion of the mirror displacement curve 814 may result in more predictable pixel placement/capture such as in systems using the MEMS oscillator 10 to scan a beam of light.

The voltage waveform may also have other shapes that produce a desired benefit. For example the voltage during the driving period P may be driven to increase, decrease, vary, vary according to a smooth function, vary according to a discontinuous function, etc. The voltage may increase during an early portion and remain steady during a later portion. The voltage may decrease during an early portion and remain steady during a later portion. The voltage may be steady during an early portion and then increase or decrease during a later portion. The voltage may increase during an early portion and decrease during a later portion. The voltage during the driving portion P may further include a pulse-width modulated portion that varies average voltage over the time of the P period by varying the duty cycle of relatively rapid pulses.

FIG. 9 illustrates another variable drive voltage embodiment that may be used, for example to avoid a dielectric breakdown voltage. Breakdown voltage instability may limit the drive voltage that may be safely applied when the comb finger electrodes are in close proximity, i.e., when Θ is small. The breakdown limit may increase when the electrodes are farther apart. According to the embodiment of FIG. 9, the drive voltage 902 may be raised to a relatively high level during portion 904 when corresponding drive electrodes are relatively far apart. As the drive electrodes near (thereby reducing the insulating capacity of the gas between the fixed electrodes 16a, 16b and the moving electrodes 28a, 28b) the drive voltage is reduced during portion 906 to reduce the propensity of a dielectric breakdown between the fixed electrodes 16a, 16b and the moving electrodes 28a, 28b. Since dielectric breakdown may typically be accompanied by a spark or electric arc, the embodiment illustrated by FIG. 9 may be especially useful in applications involving potentially explosive environments. The embodiment of FIG. 9 may also allow higher peak drive voltage (corresponding to portions 904) than may be otherwise possible for a given design. A higher peak drive voltage may be used, for example, to increase peak angular displacement, reduce electrode size, provide for variable peak angular displacement, allow operation farther from resonance, etc.

It is known that if a voltage between two electrically separated conductive plates exceeds a breakdown voltage, then a current flows from the plate at the higher voltage to the plate at the lower voltage through the electrical insulator separating the two plates. This phenomenon is often called "arcing", "sparking", or "electrostatic discharge (ESD)," and may damage or destroy one or both of the plates and/or the insulator.

The approximate breakdown voltage $V_B$ for the MEMS mirror 10 of FIGS. 1 and 4A-4B is given by the following equation when the environmental pressure p in which the MEMS operates is near normal atmospheric pressure, when the distance D between the fingers 16 and 28 is relatively small, and when the electrical insulator between the protrusions is air:

$$V_B = BpD/(C + \ln(pD)) \quad (6)$$

where B=365 Volts/(Torr·cm) and C=1.18.

Because the distance D is relatively small, ln(pD) is negligible; consequently, $V_B$ is approximately linearly proportional to the distance D(t), and, therefore, is approximately linearly proportional to the amplitude Θ(t) of the mirror plate 22. Specifically, when Θ(t)=±Θ, $V_B(t)=±V_{B1}$, and when Θ(t)=0, $V_B(t)=±V_{B2}$. $V_{B2}≠0$, however, because even when Θ(t)=0, there are still regions of the spaces 18 and 30 separating the fingers 16 and 28. Therefore, the parameter D(t) in equation (6) is slightly different than the parameter D(t) in FIGS. 4A-4B because D(t) in equation (6) does not equal zero when Θ(t) equals zero.

Referring again to FIGS. 1, 4A-4B, and 9, as long as the driving voltage V(t) is within the breakdown envelope $V_B(t)$, no arcing or electrostatic discharge occurs between the stationary plate 12 and the mirror plate 22 of the MEMS 10.

Figure 10:
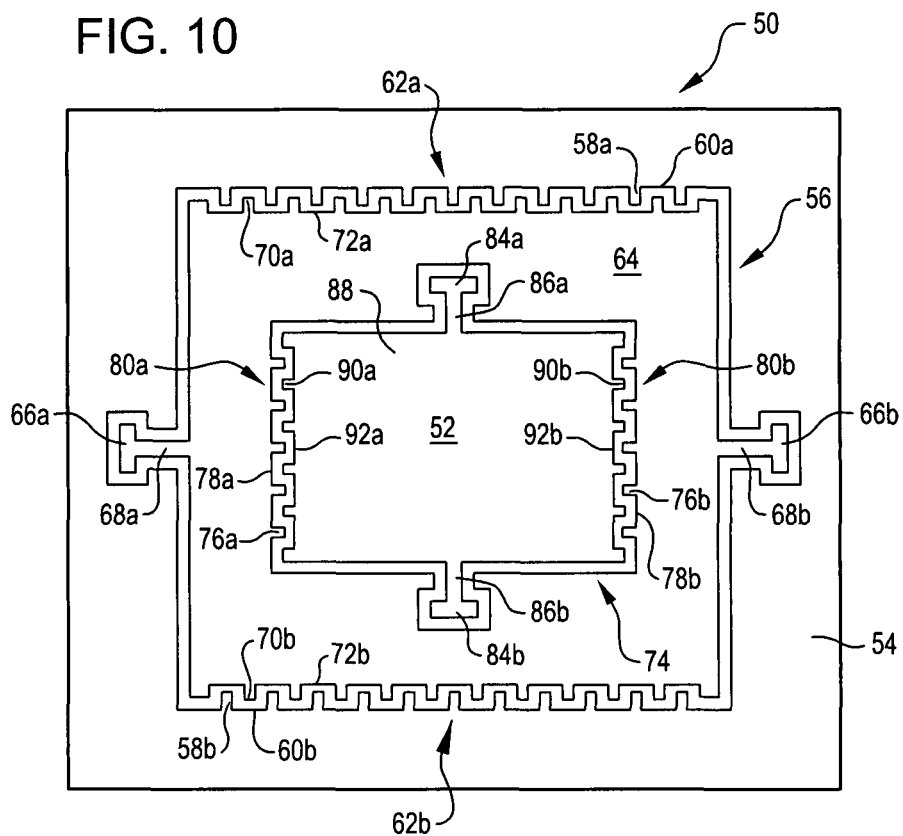
FIG. 10 is a plan view of a bi-directional MEMS mirror having a mirror plate that can oscillate in two dimensions according to an embodiment.

FIG. 10 is an isometric view of a bi-dimensional comb-drive microelectromechanical system (MEMS) mirror 50, which, like the MEMS mirror 10 of FIG. 1, is a resonant, electrostatically drivable plant. But unlike the mirror plate 22 of the MEMS mirror 10, the mirror plate 52 of the MEMS mirror 50 can oscillate in two dimensions.

The MEMS mirror 50 includes a conductive stationary plate 54, which is similar to the stationary plate 12 of FIGS. 1 and 4A-4B. The stationary plates defines a first opening 56, includes alternating fingers 58a and spaces 60a along a side 62a of the opening, and includes alternating fingers 58b and spaces 60b along an opposite side 62b of the opening.

The MEMS mirror 50 also includes a conductive and movable intermediate plate 64 disposed in the opening 56 and electrically insulated from the plate 54, and includes tabs 66a and 66b, which anchor the plate 64 to the stationary plate 54 via torsion arms 68a and 68b. The movable plate 64 includes alternating fingers 70a and spaces 72a, which are respectively aligned with the spaces 60a and the fingers 58a, includes alternating fingers 70b and spaces 72b, which are respectively aligned with the spaces 60b and the fingers 58b, and defines a second opening 74. The movable plate 64 also includes alternating fingers 76a and spaces 78a along a side 80a of the opening 74, and includes alternating fingers 76b and spaces 78b along an opposite side 80b of the opening.

In addition, the MEMS mirror 50 includes the conductive mirror plate 52 disposed in the opening 74 and electrically insulated from the plate 64, and includes tabs 84a and 84b, which anchor the plate 52 to the plate 64 via torsion arms 86a and 86b. The mirror plate 52, which is similar to the mirror plate 22 of FIGS. 1 and 4A5-4B6, includes a surface 88 that is coated with a reflective material to form a mirror on the surface, includes alternating fingers 90a and spaces 92a, which are respectively aligned with the spaces 78a and the fingers 76a, and includes alternating fingers 90b and spaces 92b, which are respectively aligned with the spaces 78b and the fingers 76b.

Consequently, one can cause the mirror plate 52 to oscillate in a first dimension by causing the plate 64 to oscillate about the torsion arms 68a and 68b, and one can cause the mirror plate 52 to oscillate in a second dimension by causing the mirror plate to oscillate about the torsion arms 86a and 86b. More specifically, one can cause the plate 64 to oscillate about the torsion arms 68a and 68b by generating a first periodic voltage difference between the plates 54 and 64, and one can cause the mirror plate 52 to oscillate about the torsion arms 86a and 86b by generating a second periodic voltage difference between the plates 64 and 52. For example, one can ground the intermediate plate 64, apply to the stationary plate 54 a first voltage V(t), and apply to the plate 52 a second voltage V(t) (the first and second voltages V(t) may be the same or different).

Figure 11:
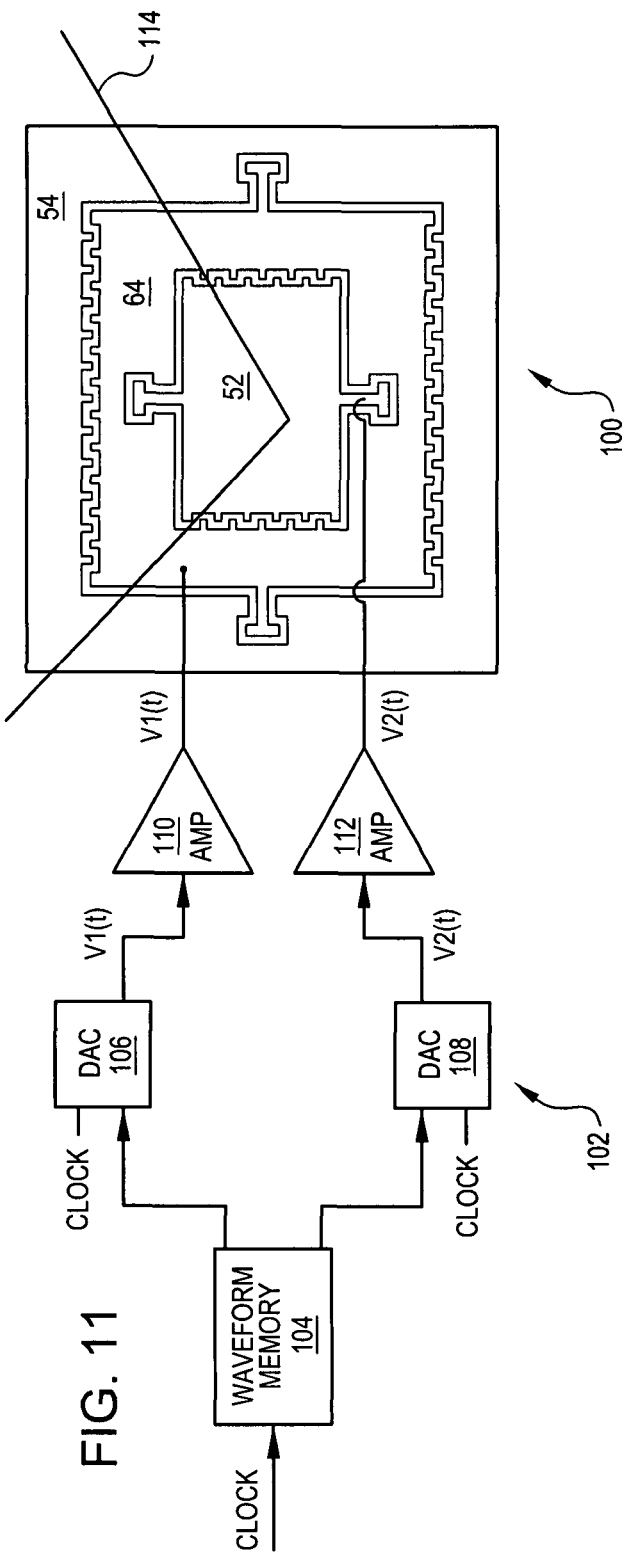
FIG. 11 is a block diagram of a beam-sweeping subsystem that includes the MEMS mirror of FIGS. 1 and 4A-4B or the MEMS mirror of FIG. 10 and that includes a circuit for driving the MEMS mirror with one or more of the voltages V(t) discussed herein according to an embodiment.

FIG. 11 is a block diagram of a beam-sweeping subsystem 100 that includes the MEMS mirror 50 of FIG. 10 and a circuit 102 for driving the MEMS mirror with one or more of the voltages V(t) discussed above in conjunction with FIGS. 8-9 according to an embodiment. Although not shown, the subsystem 100 may include the MEMS mirror 10 of FIGS. 1 and 4A-4B instead of or in addition to the MEMS mirror 50.

The circuit 102 includes a memory 104 for storing digital values that represent two voltages $V_1(t)$ and $V_2(t)$, two digital-to-analog converters (DACs) 106 and 108 for converting the respective digital values into $V_1(t)$ and $V_2(t)$, and two optional amplifiers 110 and 112 for respectively driving the plates 54 and 52 of the MEMS 50 with $V_1(t)$ and $V_2(t)$—in this example, the plate 64 is grounded or held at a non-zero constant voltage.

In operation, the circuit 102 drive the plates 52 and 54 with $V_1(t)$ and $V_2(t)$, respectively, to cause the mirror plate 52 to oscillate in two dimensions.

In response to a clock signal, the memory 104 serially provides to the DAC 106 the digital values that represent $V_1(t)$, and serially provides to the DAC 108 the digital values that represent $V_2(t)$.

Also in response to the clock signal, the DACs 106 and 108 respectively generate $V_1(t)$ and $V_2(t)$ from the digital values and respectively provide $V_1(t)$ and $V_2(t)$ to the amplifiers 110 and 112.

The amplifier 110 drives the plate 54 with $V_1(t)$, and the amplifier 112 drives the plate 52 with $V_2(t)$.

An image beam, such as a light beam 114, is directed onto the mirror plate 52, which oscillates bi-dimensionally in response to the voltages $V_1(t)$ and $V_2(t)$ on the plates 54 and 52, respectively. The oscillating mirror plate 52 thus bi-dimensionally sweeps the beam 114. To generate or capture an image (not shown in FIG. 11), one may include the MEMS mirror 50 in an image-generator or an image-capture system, respectively as discussed below in conjunction with FIGS. 12-13.

Still referring to FIG. 11, alternate embodiments of the beam-sweeping subsystem 100 are contemplated. For example, the amplifiers 110 and 112 may drive any pair of the plates other than the plates 52 and 54. Furthermore, where $V_1(t)=V_2(t)$, the DAC 108 and amplifier 112 may be eliminated, and the output of the amplifier 110 may be coupled to both plates of the driven pair. In addition, one or both of the amplifiers 110 and 112 may have differential outputs to drive a voltage difference between respective pairs of the plates 52, 54, and 64. Moreover, the circuit 102 may have a different topology, may include more or fewer components, and may include components of different types than shown in FIG. 11. Furthermore, the image beam 114 may include visible wavelengths, invisible wavelengths, or both visible and invisible wavelengths of electromagnetic energy.

FIG. 12 is a diagram of a virtual-retinal display (VRD) system 120 that may incorporate the beam-sweeping subsystem 100 of FIG. 11 according to an embodiment. In addition to the subsystem 100, the system 120 includes a conventional beam generator 122 for generating an image beam 124. The mirror plate 52 is operable to sweep the image beam 124 across a display screen or surface such as a retina 126 of an eye to generate an image frame thereon. Alternatively, the beam generator 122 may be disposed within the subsystem 100, or the subsystem 100 may be disposed within the beam generator 122.

In operation, the beam generator 122 directs the image beam 124 onto the mirror 52, which sweeps the beam through an eye pupil 128 and across the retina 126 by oscillating back and forth as discussed above in conjunction with FIGS. 4A-4B, 10, and 11.

Figure 13:
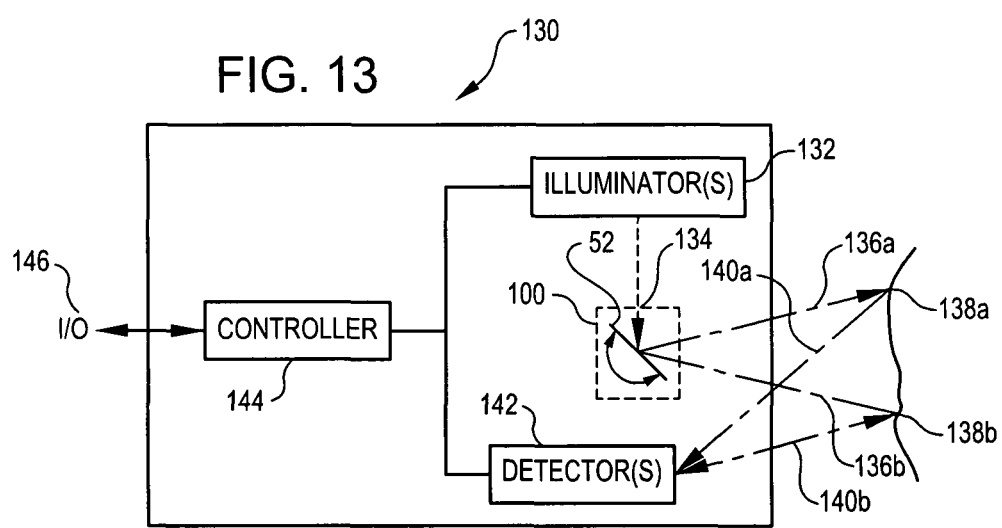
FIG. 13 is a block diagram of a scanned-image-capturing system that incorporates the beam-sweeping subsystem of FIG. 11 according to an embodiment.

FIG. 13 is a block diagram of a scanned-beam image-capture system 130 that may incorporate the beam-sweeping subsystem 100 of FIG. 1 according to an embodiment. An illuminator 132 creates a first beam of light 134. The mirror plate 52 of the subsystem 100 deflects the first beam of light 134 across a field-of-view (FOV) to produce a second scanned beam of light 136, shown in two positions 136a and 136b. The second scanned beam of light 136 sequentially illuminates spots 138 in the FOV, shown as positions 138a and 138b, corresponding to beam positions 136a and 136b, respectively. While the beam 136 illuminates the spots 138, the illuminating light beam 140 is reflected, absorbed, scattered, refracted, or otherwise affected by the properties of the object or material to produce scattered light energy. A portion of the scattered light energy 140, shown emanating from spot positions 138a and 138b as scattered energy rays 140a and 140b, respectively, travels to one or more detectors 142 that receive the light and produce electrical signals corresponding to the amount of light energy received. The electrical signals drive a controller 144 that builds up a digital image and transmits it for further processing, decoding, archiving, printing, display, or other treatment or use via interface 146.

The illuminator 132 may include multiple emitters such as, for instance, light-emitting diodes (LEDs), lasers, thermal sources, arc sources, fluorescent sources, gas discharge sources, or other types of illuminators. In some embodiments, the illuminator 132 comprises a red laser diode having a wavelength of approximately 635 to 670 nanometers (nm). In another embodiment, the illuminator 132 comprises three lasers; a red diode laser, a green diode-pumped solid state (DPSS) laser, and a blue DPSS laser at approximately 635 nm, 532 nm, and 473 nm, respectively. While laser diodes may be directly modulated, DPSS lasers generally require external modulation such as an acousto-optic modulator (AOM) for instance. In the case where an external modulator is used, it is considered part of the illuminator 132. The illuminator 132 may include, in the case of multiple emitters, beam combining optics to combine some or all of the emitters into a single beam. The illuminator 132 may also include beam-shaping optics such as one or more collimating lenses and/or apertures. Additionally, while the wavelengths described are in the optically visible range, other wavelengths may be within the scope of the invention.

The light beam 134, while illustrated as a single beam, may comprise a plurality of beams converging on the single mirror plate 52 or onto separate mirror plates 52 (only one mirror plate 52 shown in FIG. 13).

If part of a bi-directional MEMS mirror such as the MEMS mirror 50 of FIG. 10, the mirror plate 52 scans one or more light beams at high speed in a pattern that covers an entire two-dimensional (2D) FOV or a selected region of a 2D FOV within a frame period. A typical frame rate may be 60 Hz, for example. In various embodiments, both axes may be driven sinusoidally or resonantly.

Several types of detectors 142 may be appropriate, depending upon the application or configuration. For example, in one embodiment, the detector 142 may include a simple PIN photodiode connected to an amplifier and digitizer (neither shown in FIG. 13). In this configuration, beam position information may be retrieved from the scanner or, alternatively, from optical mechanisms, and image resolution is determined by the size and shape of the scanning spot 138. In the case of multi-color imaging, the detector 142 may comprise more sophisticated splitting and filtering to separate the scattered light into its component parts prior to detection. As alternatives to PIN photodiodes, avalanche photodiodes (APDs) or photomultiplier tubes (PMTs) may be preferred for certain applications, particularly low light applications.

In various approaches, simple photodetectors such as PIN photodiodes, APDs, and PMTs may be arranged to stare at the entire FOV, stare at a portion of the FOV, collect light retro-collectively, or collect light confocally, depending upon the application. In some embodiments, the photodetector 142 collects light through filters to eliminate much of the ambient light.

The present device may be embodied as monochrome, as full-color, and even as a hyper-spectral. In some embodiments, it may also be desirable to add color channels between the conventional RGB channels used for many color cameras. Herein, the term grayscale and related discussion shall be understood to refer to each of these embodiments as well as other methods or applications within the scope of the invention. In the control apparatus and methods described below, pixel gray levels may comprise a single value in the case of a monochrome system, or may comprise an RGB triad or greater in the case of color or hyperspectral systems. Control may be applied individually to the output power of particular channels (for instance red, green, and blue channels), may be applied universally to all channels, or may be applied to a subset of the channels.

In some embodiments, the illuminator 132 may emit a polarized beam 134 of light or a separate polarizer (not shown) may be used to polarize the beam. In such cases, the detector 142 may include a polarizer cross-polarized to the scanning beam 136. Such an arrangement may help to improve image quality by reducing the impact of specular reflections on the image.

From the foregoing it will be appreciated that, although specific embodiments have been described herein for purposes of illustration, various modifications may be made without deviating from the spirit and scope of the invention. Furthermore, where an alternative is disclosed for a particular embodiment, this alternative may also apply to other embodiments even if not specifically stated.

What is claimed is:

1. A method, comprising:
generating a first signal having a period and a varying magnitude during a first driving portion of the period; and
electrostatically driving a first plate of a resonant electrostatic plant in response to the first signal;
wherein the resonant electrostatic plant exhibits a torque that varies as a function of angular displacement of the first plate, and the first signal has a decreasing magnitude during the first driving portion of the period as the torque increases, wherein the first driving portion of the period occurs between a first time and a second time, the first plate having a maximum amplitude relative to a second plate of the plant at the first time and having a minimum amplitude relative to the second plate at the second time.

2. A method, comprising
generating a first signal having a period and a varying magnitude during a first driving portion of the period; and
electrostatically driving a first plate of a resonant electrostatic plant in response to the first signal;
wherein the resonant electrostatic plant exhibits a torque that varies as a function of angular displacement of the first plate, and the first signal has a decreasing magnitude during the first driving portion of the period as the torque increases, wherein the first driving portion of the period occurs between a first time and a second time, the first plate having a maximum angular displacement relative to a second plate of the plant at the first time and having a minimum angular displacement relative to the second plate at the second time.

* * * * *

UNITED STATES PATENT AND TRADEMARK OFFICE
CERTIFICATE OF CORRECTION

PATENT NO. : 8,514,205 B2  Page 1 of 1
APPLICATION NO. : 11/648852
DATED : August 20, 2013
INVENTOR(S) : Wyatt O. Davis et al.

It is certified that error appears in the above-identified patent and that said Letters Patent is hereby corrected as shown below:

TITLE PAGE, ITEM 73
Add "Ethicon Endo-Surgery, Inc., Cincinnati, OH (US)" after "Microvision, Inc., Redmond, WA (US)" in the Assignee category.

Signed and Sealed this
Fifth Day of November, 2013

Teresa Stanek Rea
*Deputy Director of the United States Patent and Trademark Office*